Patented Apr. 28, 1925.

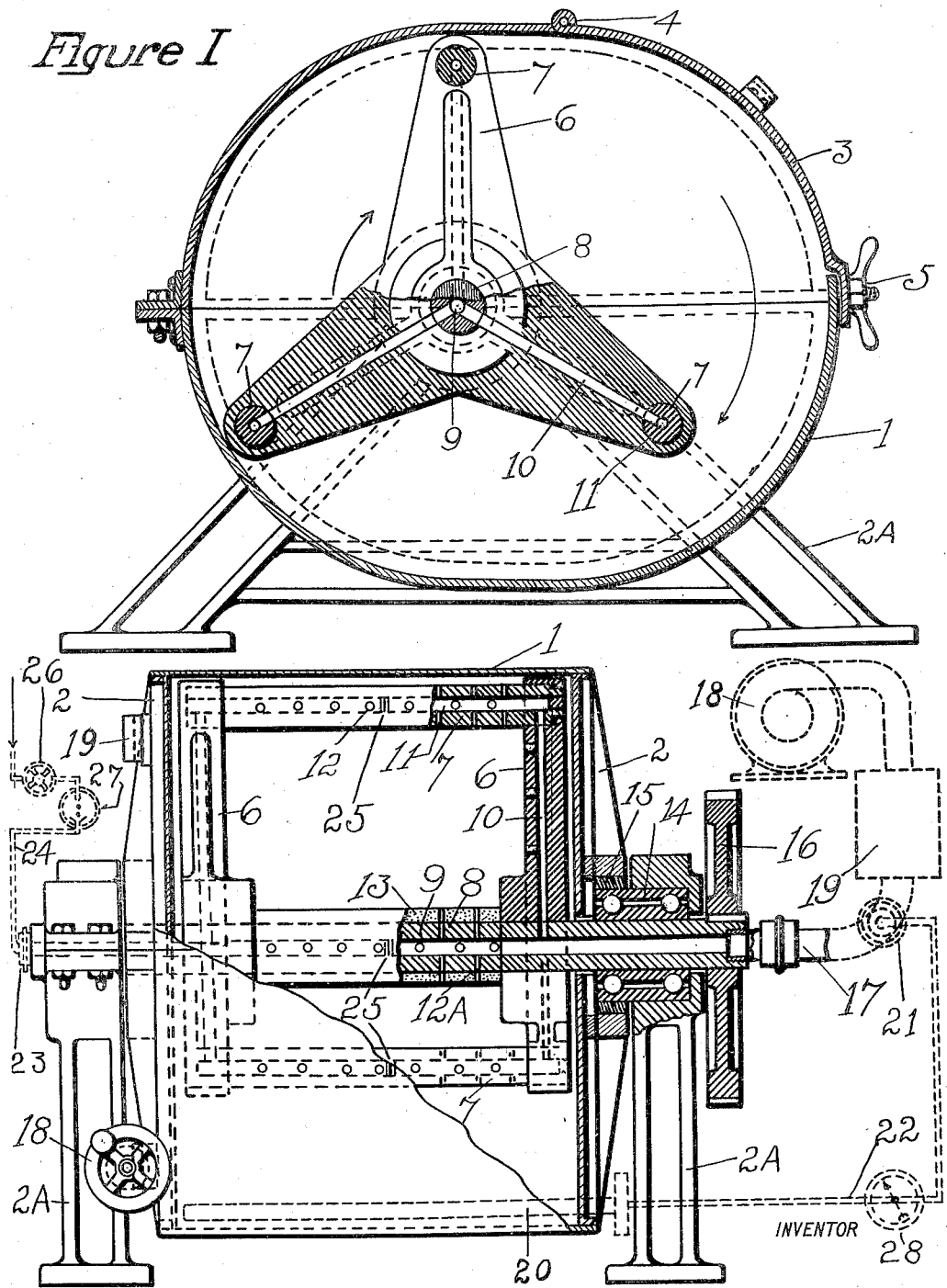

1,535,204

UNITED STATES PATENT OFFICE.

WILLIAM A. DARRAH, OF CHICAGO, ILLINOIS, ASSIGNOR TO THE EKCO ENGINEERING COMPANY, OF CHICAGO, ILLINOIS.

APPARATUS FOR MIXING BREAD.

Application filed August 14, 1920. Serial No. 403,482.

*To all whom it may concern:*

Be it known that I, WILLIAM A. DARRAH, a citizen of the United States, residing at Chicago, in the county of Cook and State of Illinois, have invented a new and useful Improvement in Apparatus for Mixing Bread, of which the following is the specification.

This invention relates to methods and apparatus for mixing and working the ingredients used in dough. The object of this invention is to provide improved methods and equipment which will give a dough from which a higher grade of bread can be produced. The bread prepared in the methods here described may be made with less yeast than is required by present practice, may be made from a weaker grade of flour and the flour will be more thoroughly hydrated, thus giving a loaf which contains more water and which is therefore softer and keeps better. It is also possible by the use of the methods and apparatus here described, to produce bread more uniformly and with less skilled help than has hitherto been possible. It is also possible to control the quality of the bread and its composition with much greater accuracy than has hitherto been possible. Many other advantages will appear as the process and apparatus is further described.

In order to make clear the basis of this invention, I will first describe in detail, the apparatus employed and then explain its method of operation and the processes with which it may be used to advantage although it should be understood that I do not wish to be confined to any single step of the process.

Referring to the drawing, Figure I is an elevation in section of one form of mixer, while Figure II is a side elevation partly in section showing further details of a construction of my device, and indicating in dotted lines the means of supplying cold air and water to the mixer and automatically controlling the temperature of the dough.

In the figures, (1) represents a shell or tank into which the ingredients to be mixed are placed. The exact construction of the shell is not of great importance but I have found it desirable to form it from steel plate, rigidly attached to steel castings (2) at the ends. The shell is provided with a door (3) attached by hinges (4) to the main shell, and locked by latch (5) in a closed position when the mixer is operating. When it is desired to load or empty the mixer the cover (3) is opened. Two end frames or spiders (6) are positioned within tank (1) upon shaft (8) which supports them and causes them to rotate. Beater bars (7) are carried at the extremities of spiders (6) and serve to mix the dough and afterwards knead it while in rotation. Shaft (8) has an axial hole extending therethrough (9) while spiders (6) have channels (10) extending from the axial hole in shaft (8) to a similar axial hole (11) in shaft (7). Beater shaft (7) is provided with radial holes (12) which allow the fluid within the axial hole (11) to mix with the dough. In a similar way radial holes (12A) are provided to allow the escape of the fluid in axial hole (9) to the dough.

I have found at times that it is harmful to allow the shaft (8) to act as a cooling medium probably because of the tendency to condense the moisture in the dough upon itself. It is therefore frequently desirable to surround shaft (8) with a heat insulating medium (13). It is not absolutely necessary in all cases to use the heat insulator (13) but I have found it a decided advantage in the case of large mixers. The shaft (8) is provided with ball bearings (14) carried in the frame (2A). By means of these bearings it is possible to rotate the spiders and the beater shaft at a high velocity with considerable uniformity and smoothness of operation.

A bearing (15) is provided in each of the end castings (2) which permits the shell (1) to rotate about the same center as shaft (8) thus facilitating loading and unloading the mixer. Hand wheel (18) operates a worm which engages with rack (19) and allows ready rotation of the shell (1) when desired.

A stuffing box (17) is connected to one end of shaft (8) and serves to admit cold air while the shaft is in rotation. The gear (16) is provided to rotate the shaft (8) by means of a pinion on a motor, countershaft or other desirable source of power. As the motor or other source of power forms no part of this invention it is not illustrated on the drawing.

A standard form of thermostat or temperature controlling device (20) is inserted in shell (1) in such a manner as to be in contact with the dough and accurately record its temperature. Any standard form of temperature control may be employed for this purpose. In the drawing I have illustrated one of the fluid pressure types of devices which is connected by pipe line (22) to temperature indicator (28) and to automatic control valve (21). Pipe line (22) is preferably made flexible to permit the unrestricted rotation of container (1) through an angle of 90 degrees or more, as required. A blower (18) which may be of the positive pressure type, the centrifugal type or an ordinary air compressor, supplies air or other gas under pressure, to cooler (19). The cold air from cooler (19) is conducted through control valve (21) to stuffing box (17) from whence it passes through the channels in shaft (8) spider (6) and beater shafts (7) and finally mixes with the dough.

At the other extremity of shaft (8) opposite the stuffing box (17) is a stuffing box (23) which is connected to pipe (24) which supplies water to the channel system in the shaft (8) beater bar (7) and spider (6). The amount of water entering through stuffing box (23) is controlled by valve (26) which may be of the needle type and a sight feed (27) is provided to gauge the rate of flow.

While I have shown channels (11) and (9) extending substantially the entire length of shaft (7) and (8) respectively, it will be noted that each of these channels is closed by plug (25) at the central point, thus preventing the water supply from mixing with the air supply. It should be understood that the drawing is entirely diagrammatic and that while the water outlets appear only on one side of the mixer, and the air outlets on the other side of the mixer, I may prefer to intermingle the air and water outlets so that they will be arranged alternately. This arrangement is desirable because of the greater ease with which a uniformly mixed dough may be secured.

I wish it to be understood that the spider and beater bars (7) are made somewhat heavier than is necessary from the standpoint of strength alone in order that when once in rotation they will exert a fly wheel effect which will reduce the strains upon the driving mechanism and upon shaft (8) as well as increase the smoothness of operation of the mixer and the uniformity of the product.

In operating this mixer the flour, water and other ingredients are placed in the shell (1) in the usual manner. The rotating element is then put in motion and after a slight preliminary mixing the temperature is lowered well below that at which yeast is active. This may be automatically controlled by the thermostat (20). I have found that a temperature ranging from 40 to 50 degrees F. is usually satisfactory.

Mixing at these low temperatures is an advantage in that the yeast is practically inactive and may be very thoroughly disseminated through the mixture before it begins to produce carbon dioxide. After the mixing has proceeded for a sufficient length of time the temperature is gradually allowed to rise until it reaches the neighborhood of 78 to 84 degrees F. At this point the yeast again becomes active, carbon dioxide is produced and the dough becomes alive and spongy. The operation of the mixer is continued without allowing the temperature to pass the above limits until the dough has reached the proper consistency. I have found that it is frequently an advantage to mix the dough from three quarters of an hour to one and a half hours and the quality of the loaf appears to improve with the length of time that the dough is treated.

By the use of this mixer it is possible to not only maintain the dough at any desired temperature without allowing overheating of any portion, but it is possible to actually enclose innumerable bubbles of cold air within the dough thus increasing the activity of the yeast as well as making the dough lighter and more porous. The use of this device also greatly improves the uniformity of the product and greatly reduces the uncertainty which is such serious drawback in the operation of the average bakery.

By means of the water inlets it is possible to introduce considerably more water into the dough than is at present possible for the reason that many small drops of water are enclosed in the dough mass during the drawing and shredding operation which takes place within the mixer. The presence of this additional moisture not only increases the softness and desirability of the bread, but also insures the thorough hydration of the gluten of the flour which results in a larger loaf and permits the use of lower grade flour. The thorough hydration of the gluten also materially delays the time that the bread becomes stale.

It will of course be understood that a mixer of this kind is designed to operate at speeds ranging from 60 revolutions per minute to 100 revolutions per minute and up. Under these conditions the dough becomes very appreciably warm, partly by reason of the friction and partly by reason of the heat of hydration which ranges from 6 to 7 B. t. u. per pound of flour. It will therefore be understood that it is essential to supply some cooling medium and this I have found can best be accomplished by cooling the air which is forced into the dough through the channels 9, 10, and 11, as previously described. When the thermostat (20) indicates that the temperatures are becoming higher than desirable the fluid pressure within the thermostat opens valve (21) allowing an excessive air to enter the mixer, thus reducing its temperature. Conversely, when the temperature has fallen too low the automatic valve (21) is closed by the thermostat (20) thus cutting off the incoming cold air. The heat produced by the friction within the dough very promptly prevents further fall in the temperature and the desired figure is thus automatically maintained.

I wish to particularly emphasize the importance of uniformity in the mixing of bread and the advantages which result from the use of my process and apparatus in improving the uniformity. It is a well known fact that in most bakeries considerable loss and inconvenience result from the fact that different lots of dough behave in a different manner and there appears to be great difficulty in predicting what may be expected when employing the ordinary process.

I have found that a considerable amount of this apparent lack of uniformity may be traced back to conditions occurring in the mixer, assuming of course, that the same ingredients are consistently employed in the same proportion. One very obvious cause of the ununiform action of the dough is the imperfect dissemination of the yeast and other ingredients through the dough. Naturally, those portions of the dough which contain the greatest amount of yeast will develop most rapidly though not necessarily with best results.

Another important result of mixing is the thorough aeration of the dough in a uniform manner. It is of course well understood that yeast requires a certain amount of oxygen for its best development. Dough which contains more mixed air in some portions than in others will not develop uniformly, those portions containing the greatest amount of air usually showing the greatest activity from the yeast. In present types of mixers different batches of dough are frequently subjected to different atmospheric conditions with the result that the different lots behave very differently while setting, while being proofed, and while being baked.

Another important factor which adversely affects uniformity is the variation in temperature in different portions of the dough. It is a well known fact that a difference of 5 degrees to 10 degrees in dough temperature has an extremely great effect upon the activity of the dough, and the quality of the finished bread. It is also a fact that dough because of its porous nature is a poor conductor of heat. Because of the low heat conductivity of the dough and the fact that much heat is generated in the ordinary mixing and kneading process it is not at all uncommon to find from 15 degrees to 20 degrees difference in temperature in different parts of a lot of dough. This condition is particularly aggravated in those mixers which depend upon the absorption of heat by a cold body located in the central portion of the dough but out of contact with it. The difficulty of course results from the slow rate of heat conductivity through the dough.

I have overcome this difficulty by introducing cold air at the place where the heat is produced, namely, at the beater arms. By introducing cold air at this point the heat is absorbed and a considerable amount of air is trapped in the dough and distributed uniformly through it, thus thoroughly aerating the dough as well as insuring that its temperature will be very uniform throughout its mass. This I claim to be one of the valuable advantages of the process and apparatus which I have invented.

Having now fully described my invention what I claim as new and wish to secure by Letters Patent in the United States is as follows:

1. A dough mixer comprising a shell, a channeled shaft rotatable therein, a beater system carried on said shaft and channels for introducing both cold air and water into the interior of the dough within said mixer.

2. In a dough mixer a beater system arranged for moving through the dough at relatively high speeds and channels in said beater system for introducing both air and water into the interior of the dough.

3. A dough mixer comprising a shell, a channeled rotatable shaft, a channeled beater system carried by said shaft and having passages connecting with the channels in said shaft, a source of air maintained at a temperature below 50 degrees, and automatic means controlling the admission of air into the device.

WILLIAM A. DARRAH.